United States Patent

[11] 3,549,909

[72] Inventors Alexander Michael Adelson Elmsford; Jerome Swartz, Stony Brook, N.Y.

[21] Appl. No. 852,858

[22] Filed Aug. 25, 1969

[45] Patented Dec. 22, 1970

[73] Assignee Hall-Barkan Instruments, Inc. Tuckahoe, N.Y. a corporation of New York Continuation-in-part of application Ser. No. 540,056, Sept. 16, 1966, now abandoned, and a continuation-in-part of 614,471, Feb. 7, 1967, now abandoned, and a continuation-in-part of 799,163, Feb. 14, 1969, now Patent No. 3,530,312.

[54] TOUCH ACTIVATED AC, FULL WAVE, TWO-WIRE SWITCHES

12 Claims, 7 Drawing Figs.

[52] U.S. Cl. .......... 307/252, 317/123, 317/146; 328/5; 331/65; 340/250

[51] Int. Cl. .......... H03k 17/00

[50] Field of Search .......... 307/252, 305; 340/250(C); 317/146, 123P; 331/65, 111; 328/5

[56] References Cited

UNITED STATES PATENTS

| | | | |
|---|---|---|---|
| 2,021,034 | 11/1935 | Thompson | 250/41.1 |
| 3,200,304 | 8/1965 | Atkins et al. | 317/146 |
| 3,200,305 | 8/1965 | Atkins | 317/146 |
| 3,255,380 | 6/1966 | Atkins et al. | 315/297 |
| 3,303,397 | 2/1967 | Myers | 317/148.5 |
| 3,307,071 | 2/1967 | Diamond | 315/160 |
| 3,329,838 | 4/1967 | Meyers | 307/125 |
| 3,332,031 | 8/1967 | Reid | 331/111 |
| 3,467,828 | 9/1969 | Graf | 307/252 |
| 3,492,542 | 1/1970 | Atkins | 317/146 |

*Primary Examiner*—Donald D. Forrer

*Assistant Examiner*—J. D. Frew

*Attorney*—Kirschstein, Kirschstein, Ottinger & Frank

ABSTRACT: A solid state switch having only a pair of wires for connecting it into a circuit to be controlled thereby and having a semiconductor gated circuit in which current flow is initiated by the touch of a human finger, or the like, to cause full wave current to flow through the semiconductor device. The touch initiates conduction in the semiconductor circuit by causing a control voltage to be applied to the semiconductor gate through a normally high impedance which is changed to a low impedance state upon touching a control terminal of the said impedance.

INVENTORS
ALEXANDER MICHAEL ADELSON
JEROME SWARTZ
BY
[signature]
ATTORNEYS

INVENTORS
ALEXANDER MICHAEL ADELSON
JEROME SWARTZ
BY
Kirschstein, Kirschstein, Ottinger & Frank
ATTORNEYS

TOUCH ACTIVATED AC, FULL WAVE, TWO-WIRE SWITCHES

CROSS-REFERENCE TO RELATED APPLICATIONS

This application is a continuation-in-part of our copending application Ser. No. 580,056 filed Sept. 16, 1966 now abandoned for TOUCH RESPONSIVE MOMENTARY SWITCH CIRCUIT, of our copending application Ser. No. 614,477 filed Feb. 7, 1967 now abandoned for TOUCH ACTIVATED, AC, FULL WAVE, TWO-WIRE SWITCHES, and of our copending application Ser. No. 799,163 filed Feb. 14, 1969, now U.S. Pat. No. 3,530,312 for TOUCH RESPONSIVE MOMENTARY SWITCH CIRCUIT, and is an improvement on the invention disclosed in our copending application Ser. No. 572,092 filed Aug. 12, 1966, now U.S. Pat. No. 3,493,791 for TOUCH ACTIVATED SEMICONDUCTOR SWITCH.

BACKGROUND OF THE INVENTION

1. Field of the Invention

A touch responsive momentary switch employing in the activating leg of the switch circuit a normally high impedance which is discontinuously changeable from a high to a low impedance state upon a control terminal thereof being touched by a foreign body.

2. Description of the Prior Art

Insofar as the inventors are aware, there is no relevant prior art. The closest art of which knowledge is had is a switch circuit in which a glow discharge tube is located in the activating leg; but in such circuit the glow discharge tube is activated to its normal glow discharge region which is quite different from the circuit of the present invention.

Generally speaking, the instant invention relates to electronic device systems and, more particularly, to solid state electronic switches of the class which are responsive to the touch of a human operator, or the like, to change from an "OFF" condition to an "ON" condition.

The prior art contains numerous switch circuits, some of which are of the solid state type and are actuated in the manner described, i.e. by the touch of a foreign body such as a human finger; but, in general, these switching circuits are relatively complicated in circuitry and contain a considerable number of components so that they are not capable of being embodied in a physically and electronically compact form as is required in many present-day applications. Moreover, in prior art devices the touch operator, i.e. contact, serves as a passive element, being connected into the internal power of the system to create a triggering path. In other words, the touch element, in effect, forms a bridge, or the like, between a control element such as a gate and an internal source of power so that such element is not a true activator of the switching component within the device to directly initiate triggering, thereby, among other features, in accordance with the present invention avoiding any electrical danger to the user which could result if an overly high potential finds its way through a stray path or a defective component to the touch contact. Moreover, the prior art does not disclose full wave touch activated momentary and latching switches which have only two output terminals that enable the switches of the present invention to be easily connected into AC circuits which are to be controlled thereby.

Commutation in AC circuits is a natural phenomenon and obtaining circuit "HOLD-ON," in a touch activated switch circuit, which is contrary to the normal mode of operation, is one of the problems to be solved, in general, in connection with AC touch activated switches. The prior art discloses continual ON triggering in AC silicon controlled rectifier (SCR) circuits by synchronizing the triggering signal to the line frequency, or providing some other external synchronizing technique to not only trigger but continue the firing of the SCR past the AC zero crossing point in order to stay ON every cycle. However, these external synchronization design solutions are generally complicated, contain a considerable number of circuit components which increase the physical size and complexity of the overall touch activated switch circuit, and are generally too expensive for many of the applications in which the switch could be used.

SUMMARY OF THE INVENTION

The present invention provides an internal HOLD-ON technique to counter the commutating effects of the full wave rectifier AC source power from the bridge circuit portion of the switch circuit as it approaches zero. This technique and circuitry for accomplishing the same is shown and described in the aforementioned applications Ser. Nos. 580,056 and 799,163 wherein the turn ON or activation of the semiconductor switch is accomplished by controlled feeding of the power available at the anode gate of the SCR to the cathode gate thereof. This is achieved by inserting a very high impedance element in a circuit extending between the anode gate and the cathode gate which element is capable of a sudden change in impedance state to a lower impedance in response to the touch of a human finger, thus allowing power to be transferred to the cathode gate and the SCR to be turned ON in full wave operation.

In said applications Ser. Nos. 580,056 and 799,163 touch responsive, full wave, two-wire switch circuits including a pair of neon tubes in conjunction with a four-lead SCR are disclosed, which operate on this technique. The circuits of the present invention incorporate the same general internal HOLD-ON technique but represent a departure in that each switch circuit disclosed herein either is a simplified version of those disclosed in the last two mentioned applications, accomplishing the same functional objectives, or is a sophisticated form of those previously disclosed, but improving the versatility and/or reliability of the switch circuits. The circuits of the present invention also provide a touch activation circuit for feeding the power available at the anode of the semiconductor switch to the cathode gate to accomplish the switching and internal HOLD-ON technique.

The switches of the present invention contain very few circuit components, are relatively inexpensive in comparison with prior art switches, present no potential electrical danger to the user, this being achieved by isolating the user from the power flow path, can be housed in a single physically compact unit with a touch activating surface on one side of the unit, and provide only a pair, i.e. only two, terminals for connecting the switches into the circuits to be controlled.

Other advantages of the circuits of the invention will become apparent to a worker skilled in the art from the following specification.

BRIEF DESCRIPTION OF THE DRAWINGS

In the accompanying drawings in which are shown various possible embodiments of the invention.

Figure 1:
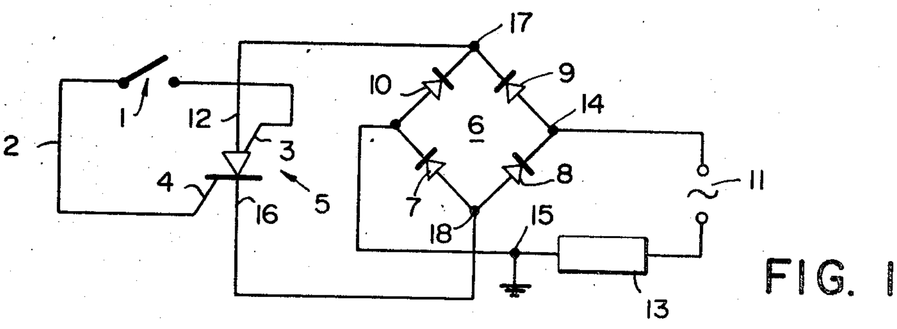
FIG. 1 is an electrical schematic diagram illustrating the theory of operation of the switch circuits of the present invention through the use of a single-pole single-throw switch that is an exemplificative electrical equivalent of the SCR that is actually employed in the operative circuits of the invention.

In all of the circuits of the present invention a conventional full wave diode bridge circuit 6 composed of diodes 7, 8, 9 and 10 connected in the usual bridge manner, is employed in conjunction with an AC power source 11 to supply full wave rectified power (voltage and current) to the anode 12 of the SCR 5. Typically the AC source is a household source in the order of 110 to 120 volts. The AC source 11 and a load 13 to be energized by the switching circuit are connected in series across the terminals 14, 15 of the bridge 6. These terminals represent the two output terminals of the two-wire switches, such terminals being the terminals that are connected into the power circuit to be controlled. The anode 12 and the cathode 16 of the SCR 5 are connected across the full wave terminals 17, 18, respectively, of the bridge 6.

Figure 2:
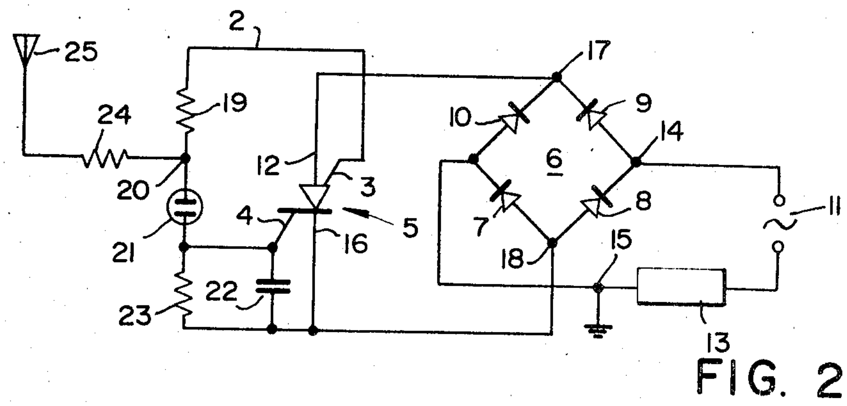
FIG. 2 is an electrical schematic diagram of a touch activated, AC full wave, two-wire momentary switch according to the present invention.

The circuit of FIG. 2 is a touch activated, full wave, two-wire momentary switch employing an SCR of high sensitivity, e.g. the gate sensitivity of the SCR does not exceed 10 microamperes, i.e. will function at a gate current of 10 $\mu a$ or less, and medium power capability, e.g. 10 to 100 watts. A resistor 19, for example, of approximately 22 megohms, is connected in the circuit 2 between the anode gate 3 and a junction 20. A glow discharge device 21, e.g. a neon tube, is connected between the junction 20 and the cathode gate 4.

Figure 7:
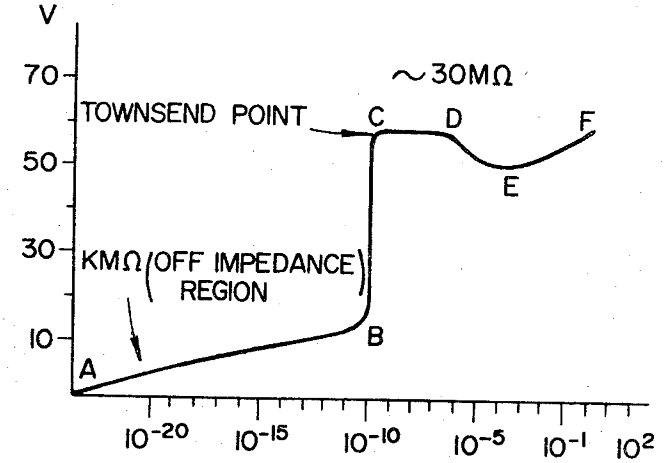
FIG. 7 is a plot showing the voltage-current characteristic curve of a neon glow discharge device. DESCRIPTION OF THE PREFERRED EMBODIMENTS Referring to the drawings wherein like numerals designate like components, attention is directed first to FIG. 1 which illustrates the theory of operation of switches of the present invention, the same being set forth in detail in applications Ser. Nos. 580,056 and 799,163 and is incorporated herein by reference. Briefly, by inserting a very high impedance element, e.g. hundreds or thousands of megohms, at the switch point 1 in the trigger circuit 2 extending between the anode gate 3 and the cathode gate 4 of an SCR 5 which high impedance element is capable of a state of impedance change to a lower impedance, e.g. tens of megohms, when the switch is closed, this being the equivalent of applying a finger to a touch response element, the circuit 2 is completed. Such completion feeds the power available at the anode gate 3 to the cathode gate 4 and, as a consequence, turns the SCR 5 ON from an internal source of power (the anode gate). The quantitative reduction in the impedance level of the impedance element is determined by the amount of current required for full wave turn ON of the SCR.

The neon glow tube has a high impedance in its OFF state, e.g. an impedance in the range of 2K megohms so that in its OFF state the neon tube prevents the voltage present at the anode gate 3 from triggering the SCR 5 to its ON state. The voltage drop across the tube is insufficient to break it down. The voltage-current characteristic curve of a typical neon glow discharge device such as the device 21 is shown in FIG. 7. The principal regions on this curve are indicated by the points A, B, C, D, E and F. Region AB is the OFF region and in this region the tube has a high impedance, e.g. in the order of 2K megohms. The region BC is the constant current region. The point C is the Townsend discharge point or, phrased differently, the nonself-maintaining discharge point. The region CD is the nonself-maintaining discharge region. The region DE is the negative resistance region. The region EF is the normal glow discharge region. This is the region that is conventionally utilized as the breakdown region employed for everyday operation of the neon glow discharge device. It will be pointed out later that the glow discharge device is changed from its high impedance state which is the region AB to a low impedance state in order to trigger the SCR. The low impedance state at which said glow tube operates in accordance with the present invention is in the region above C and below E, i.e. above the Townsend discharge point and below the nonself-maintaining discharge point, at which time said tube has a low impedance in the order of 30 megohms.

Hence, it will be seen that the neon glow discharge device like the high sensitivity SCR has a triggering sensitivity less than about 10 $\mu a$.

Experimentally it has been determined that the external circuit impedance connecting the cathode gate to the anode gate for a 110 volt line source with a typical SCR need only be as little as about 40 megohms (and can be up to the order of 100 megohms) to achieve full turn ON of such SCR. When the touch element (antenna) 25 which is connected through a resistor 24 to the junction 20 is touched by a human finger or its electrical equivalent the omnipresent voltage pickup of the human body which normally is in the range of 1 to 5 volts, typically 60 cycles, from ambient conditions of the surrounding vicinity is applied to the junction 20 and brings about a drastic decrease in the dynamic impedance of the neon tube 21 from the high thousands of megohms impedance previously mentioned in the OFF region AB (e.g. 2K megohms) to the dramatically lower tens of megohms low impedance of the CE region (e.g. 30 megohms), upon which the total triggering circuit impedance is below the impedance that would maintain the SCR in the OFF state. That is to say, touching of a human finger or foreign body to the junction 20 (which constitutes a control terminal for the glow tube 21) through the resistor 24 will cause an extremely visible glow discharge to appear in the form of small point sources around both electrodes of the glow tube 21. At this time the glow tube is in the region above C and below E and has a low impedance, e.g. 30 megohms. Accordingly, when touching of the element 25 by a human finger reduces the cathode gate to anode gate impedance to such a low impedance value, current will flow in a microampere range in the circuit 2 to the cathode gate 4 to an extent sufficient to cause the SCR to switch to the ON state. As long as a person's finger is in contact with the touch element 25 the trickle current in the cathode gate circuit maintains the switch in the ON state, full wave, independent of the power supply or pickup signal polarity. It will be observed that the person's finger does not bridge two elements of which one is connected to a source of power so that there is no danger of a high potential being applied to the finger. As soon as the person's finger is removed from the circuit the commutating effect of the full wave current on the anode 12 turns the SCR 5 OFF to give the full wave momentary switching action, i.e. to cut off the avalanche flow of current through the SCR power terminals.

Utilizing a resistor 19 in series with a single neon tube in the control (triggering) circuit 2 rather than a pair of neon tubes reduces the cost of the circuit components. Furthermore, it reduces stray leakage problems and the loss of sensitivity due to various radiation sources and aging, thus simplifying packaging techniques and reducing packaging material costs.

The resistor 24 typically is about 300K ohms or more. It is employed as a safety device to isolate the touch element 25 and to prevent accidental damage to the SCR 5 arising from accidental short circuiting caused by touching the element 25 to a floating potential.

A parallel suppression circuit is provided for the SCR, the same constituting a resistor 23 and a capacitor 22 connected in parallel between the cathode gate 4 and the cathode 16. The values of said resistor and capacitor are so selected as to provide a low-pass filter, i.e. to present a poor bypass to the potential present on a human body (by virtue of the ambient ubiquitous power supply) touching the element 25 and a good bypass to substantially higher frequencies such as are generated by spurious electric noises and static. A good working value for the capacitor 22 is 0.01 microfarads and a good working value for the resistor 23 is 330K ohms.

Typical types for the SCR 5 (sensitive to low gate currents, e.g. less than 10 microamperes) which will function well in the invention are GE 3N84 SCS and Solid State Products Inc. (SSPI) AA 1041-HBO2 SCR.

Figure 3:
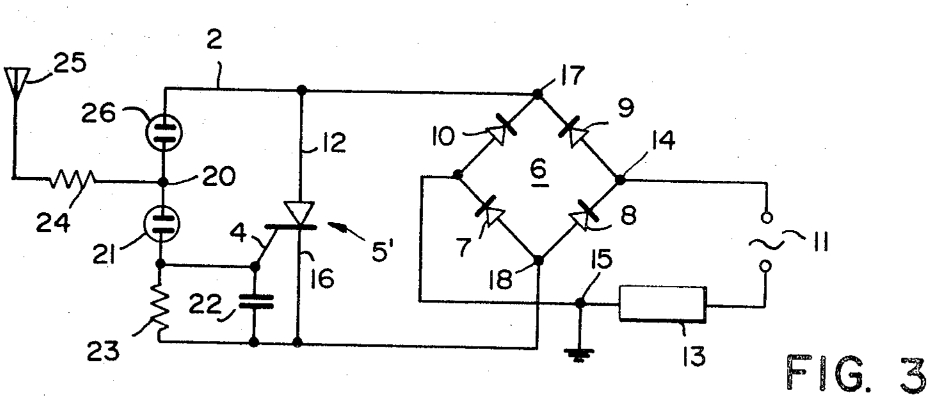
FIG. 3 is an electrical schematic diagram of a modified form of the switch circuit of FIG. 2.

Another full wave momentary switch is shown in FIG. 3. The circuits of applications Ser. Nos. 580,056 and 799,163 and FIG. 2 herein involve four-lead SCRs. In FIG. 3 hereof a neon tube 26 is connected between the anode 12 of an SCR 5' and the junction 20, while the neon tube 21 and the remainder of the circuit is connected in the same fashion as shown in and described with respect to FIG. 2. In other words the circuit of FIG. 3 differs from the circuit of FIG. 2 in the substitution of the neon tube 26 for the resistor 19, in the use of an SCR 5' having no anode gate 3 and in the connection of the triggering circuit 2 to the anode 12 instead of to an anode gate. This provides a different HOLD-ON mechanism. In the previous momentary switch of FIG. 2, HOLD-ON for full wave operation is a result of the trickle current flow between the anode gate and the cathode gate as described above, but in the circuit of FIG. 3, the signal flow enabling full wave operation is as follows:

Referring to FIG. 3, when the input AC source 11 swings into its positive half cycle with respect to the physical ground 15 on the other side of the load 13, the diodes 9 and 7 are forward biased. With the SCR in its OFF-state, the anode-ground voltage $V_{17/15}$ then follows the input positive half cycle and the cathode voltage $V_{18/15}$ equals 0, the cathode being at ground potential (through the diode 7). For the negative half cycle, the diodes 10 and 8 are forward biased so that the anode is grounded and $V_{18/15}$ follows the negative half cycle. Thus, without actuation of the SCR 5', $V_{17/15}$ is the positive going half wave rectified portion of the input and $V_{18/15}$ is the negative half wave portion (all with respect to ground), the SCR seeing a difference voltage $V_{17/18}$ which is the expected full wave rectified bridge power. Furthermore, the cathode gate voltage $V_{4/15}$ essentially follows the cathode voltage since the cathode gate-cathode -cathode junction diode $_{4/16}$ is forward biased due to the full wave supply (i.e. $V_{4/18}$**0). Thus, the anode-cathode voltage all appears across the balanced neons 26, 21 which (ideally) equally divide the full wave rectified line voltage into two positive-going, half amplitude, full wave rectified signals $V_{17/20}$ and $V_{20/4}$ . Now the neon junction voltage to ground $V_{20/15}$, which can be obtained from the formula $V_{20/15} = V_{20/17} + v_{17/15} = V_{17/15} - V_{17/20}$, is the difference between a half wave rectified 110 v RMS AC signal and a full wave rectified 55 v RMS AC signal which is a 55 v RMS sinusoid.

Now consider the touch actuation process and assume a positive half wave input at 11, so that $V_{20/15}$ is positive. As previously discussed the cathode 16 (18) and gate 4 are then at physical ground 15, so that the person's body (in excess of 30 MΩ at 60 cycles, in series with the protective limiting resistor 24) effectively shunts the OFF-neon tube 21 (having an OFF impedance of kilomegohms). Essentially all the anode-gate voltage thus appears across the neon 26, causing it to drastically change impedance from the high OFF-impedance kilomegohm state to the lower impedance state between the nonself-maintaining discharge point and the beginning of the normal glow discharge, said triggering details described in our copending application Ser. No. 799,163 . With the drop in impedance across the neon tube 26, the shunted OFF-neon tube 21 now sees most of the full wave voltage division, so that it, too, is triggered into the lower impedance state. The (positive) current flow is thus from the anode 17 through the neon tube 26, then splitting up through the tie point 20 to ground, and through the neon tube 21 into the gate to ground, thus turning on the SCR 5' .

For the negative-going input half cycle, $V_{15/20}$ is positive and the anode 12 (17) is at physical ground potential 15, so that the body essentially shunts the neon tube 26 and all the full wave voltage appears across the neon tube 21. The neon tube 21 is thus actuated to a lower impedance state which, in turn, develops sufficient voltage across the neon tube 26 to drive it into the lower impedance state. Current is thus directed from ground, dividing at the tie point 20 into the anode 17 through the neon tube 26 and into the cathode gate 18 through the neon tube 21, which provides a turn-on signal for the SCR 5'. The SCR 5' then, in this circuit configuration and mode of actuation, sees a full wave rectified gate drive for the entire input cycle, so that full wave, touch activated, two wire switch operation is achieved. As the operator's finger is removed from the the antenna 25, the SCR 5' switches to the OFF-state when the full wave rectified bridge current at the anode swings below the SCR holding current.

This detailed description of the operation of FIG. 3 applies to FIGS. 2 and 4—6 as well.

The capacitor 22 and resistor 23 are the same and serve the same function as the like elements in FIG. 2.

Figure 4:
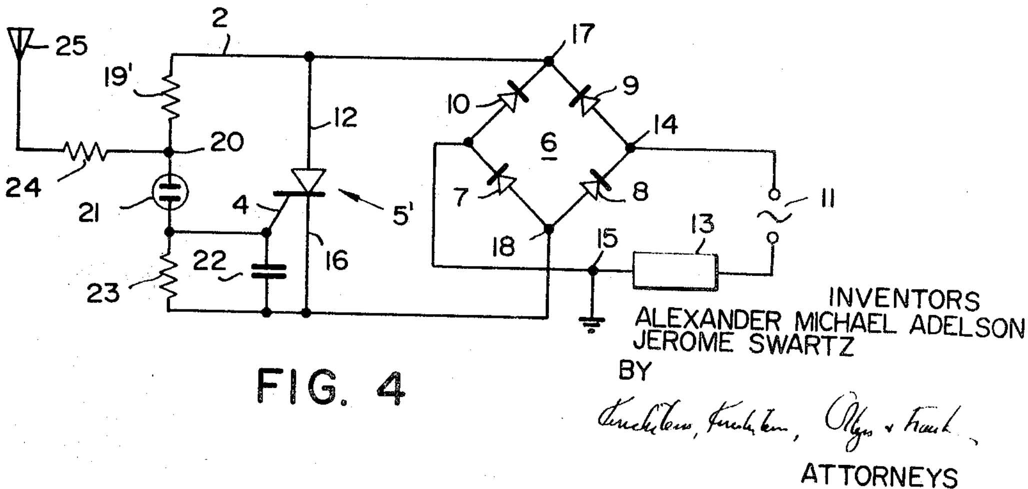
FIG. 4 is an electrical schematic diagram of another modified circuit of the momentary switch circuit of FIG. 2.

The circuit of FIG. 4 is a modified form of full wave, momentary switch utilizing the triggering circuit components of FIG. 2, with the triggering circuit arranged in the manner of FIG. 3. The FIG. 4 circuit is basically the same as the circuit of FIG. 3 except that the neon tube 26 is replaced by a resistor 19' similar to the resistor 19 of FIG. 2 and of the same value and with the further difference that this resistor 19' is directly connected between the anode 12 and junction 20 rather than between the anode gate and junction 20. The operation of the FIG. 4 circuit is the same as described with respect to the circuit of FIG. 3 with the obvious difference that the resistor 19' has a fixed impedance value while the neon tube 26 is discontinuously switchable between a high impedance state and a low impedance state; hence, in the operation of the FIG. 4 circuit the only high/low impedance change is that of the neon tube 21.

Figure 5:
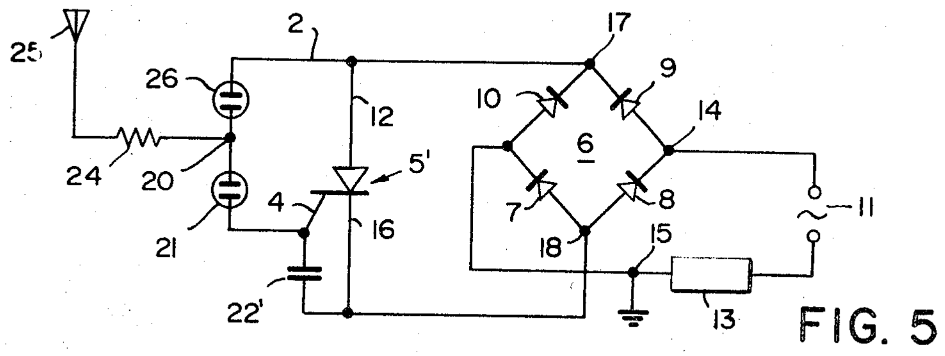
FIG. 5 is an electrical schematic diagram of an AC full wave touch activated latching switch which is a modified form of the circuit of FIG. 3.

The circuit of FIG. 5 is a full wave, high power AC latching switch, similar in construction to the circuit of FIG. 3, but in operation there is a significant departure from the operation of the FIG. 3 circuit, specifically, the addition of an electronically controlled latching ON function. Another novel aspect of the FIG. 5 switch circuit is that the SCR 5' need not be the highly sensitive type normally utilized and described with respect to the previous switches, since sufficient internal drive is supplied through the neon breakdown control circuit from the anode 12 to the cathode gate 4, but, rather, it may be a typical high current (e.g. 7.5 amperes) medium gate sensitive (e.g. 10 microamps or somewhat higher, typical rather than 10 microamps minimum) device of the common commercial grade of SCR, such as the GE C22 series. In this FIG. 5 circuit the HOLD-ON circuit consists of a capacitor 22' or any other equivalent storage element that is capable of accumulating enough energy through the cathode gate, for example during the ON part of a cycle, to HOLD-ON the SCR during the OFF (crossover point) interval of the cycle by supplying the cathode gate 4 with discharge current.

In operation of the FIG. 5 circuit the neon tubes 21, 26 are normally OFF and present a high impedance in the manner explained heretofore. When the operator's hand touches the antenna 25 a ground loop is completed which extends from the human body, through the ground side of the power supply, through the switch, and finally through one or the other of the neon tubes 21 or 26, depending upon the then-prevailing polarity of the power supply. This drops the impedance level of the neon tubes to a low impedance state as heretofore described in which state the impedance presented is sufficiently low to cause a large enough current flow from the anode 12 to the cathode gate 4 for initiating the turn ON (avalanching) of the SCR 5' . The capacitor 22' takes over at this point, continuing the HOLD-ON by the energy stored therein, and the neon tubes 21, 26 become functionally unnecessary for triggering, even though they still may be in their low impedance state because the operator's finger is still touching the antenna 25. Moreover, when the operator's finger is removed from the antenna the SCR 5' remains ON. To open the load circuit it is necessary to disconnect the load from the source of power as by a mechanically actuated switch (not shown). Structurally the circuit of FIG. 5 resembles the circuit of FIG. 3 with the cathode gate resistor 23 omitted but with a larger value assigned to the capacitor 22' (here replacing the capacitor 22) which is sufficient to act to store the energy necessary to trigger the cathode gate of the SCR immediately after each OFF interval of the power w supply cycle.

Figure 6:
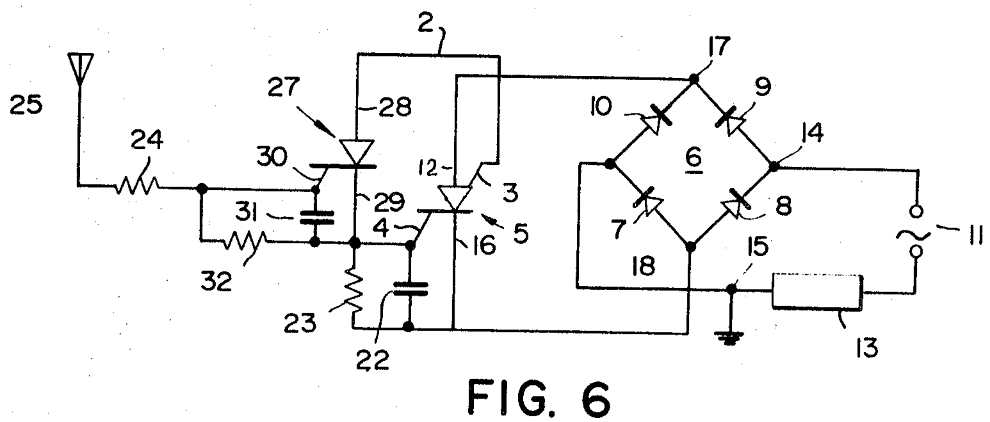
FIG. 6 is an electrical schematic diagram of a modified form of a full wave momentary switch according to FIG. 2.

The circuit of FIG. 6 is a modified form of the circuit of FIG. 2 in which a selected full wave momentary SCR 27, e.g. an HBOII, is used to replace the neon tubes and, in turn, supply full wave drive to a high power four-lead SCR (e.g. an SCR capable of passing 1 kilowatt) from its anode gate 3 to its cathode gate 4. A typical sensitivity for the SCR 27 is in the order of 10$\mu a$ or somewhat more so that it is basically a medium gate sensitivity SCR. The SCR 27 is a three-lead SCR having its anode 28 connected to the anode gate 3 of the SCR 5 and its cathode 29 connected to the cathode gate 4 of the SCR 5. The antenna 25 is connected through the resistor 24 to the cathode gate 30 of the SCR 27. A capacitor 31 and a resistor 32 connected in parallel are connected between the cathode gate 30 and the cathode 29 to form a bypass circuit of the type heretofore mentioned.

In this FIG. 6 circuit the SCR 27 functions as a high impedance device which is discontinuously switchable from a high impedance state to a low impedance state by regulating a control terminal thereof and in this respect is similar in operation to the neon tube 21. The signal from an operator's hand on the antenna 25 turns the SCR 27 ON, causing current to flow from the anode gate 3 to the cathode gate 4 of the SCR 5 which, in turn, switches the SCR 5 ON. The operation is thus very similar to the operation of the circuit of FIG. 2. However, this FIG. 6 circuit is more expensive to manufacture; nevertheless, it is easier to tailor to special environments in which, for one reason or another, the use of neon tubes is either not desirable or not permitted.

It thus will be seen that there are provided circuits which achieve the various objects of the invention and which are well adapted to meet the conditions of practical use.

As various possible embodiments might be made of the above invention, and as various changes might be made in the embodiments above set forth, it is to be understood that all matter herein described or shown in the accompanying drawings is to be interpreted as illustrative and not in a limiting sense.

I claim:

1. A touch responsive switching circuit comprising, semiconductor means discontinuously switchable between a conductive state and a nonconductive state, said semiconductor means including at least an output terminal, a return terminal and an electrically responsive control terminal, an external source of electrical energy having a grounded terminal, a full wave rectifier bridge having a pair of input terminals and a pair of output terminals, an electrical energy load, circuit means connecting said external source of electrical energy in series with said bridge input terminal and said electrical energy load, circuit means connecting said bridge output terminals, said output terminal of the semiconductor means and said return terminal of the semiconductor means in series, a voltage supply terminal which is a source of electrical energy with respect to said control terminal, normally high impedance electronic means constituting series connected impedances at least one of which is normally high, said normally high impedance electronic means having a control terminal constituting the junction between said impedances, said at least one normally high impedance being discontinuously changeable between a normal high impedance state and a low impedance state, contact means adapted to be touched by a foreign body, circuit means connecting said voltage supply terminal to said control terminal of said semiconductor means through said high impedance means and circuit means connecting said contact means to the control terminal of said high impedance means, so that when said contact means is touched by a foreign body the impedance of said at least one high impedance is switched from a high impedance state to a low impedance state, such switching of said at least one high impedance to the low impedance state permitting electrical energy to be applied therethrough from said voltage supply terminal to said control terminal of the semiconductor means in a sufficient amount to forthwith switch the semiconductor means from one of its said states to the other of its said states so as to control the flow of electrical energy from said bridge and said source of electrical energy through said load and provide an essentially full wave output.

2. A touch responsive switching circuit as set forth in claim 1, wherein both of said impedances are normally high.

3. A touch responsive switching circuit as set forth in claim 1, wherein the control terminal of the normally high impedance electronic means has a sensitivity not exceeding about 10 microamperes.

4. A touch responsive switching circuit as set forth in claim 2, wherein the semiconductor means has a gate sensitivity not exceeding 10 microamperes.

5. A touch responsive switching circuit as set forth in claim 1, wherein the semiconductor means has a gate sensitivity not exceeding 10 microamperes, and wherein the control terminal of the normally high impedance electronic means has a sensitivity not exceeding about 10 microamperes.

6. A touch responsive switching circuit as set forth in claim 1, wherein the semiconductor means has a gate sensitivity not exceeding 10 microamperes, wherein both of the impedances are high impedances, and wherein the semiconductor means is an SCR.

7. A touch responsive switching circuit as set forth in claim 1, wherein said at least one high impedance comprises a glow discharge device and the other impedance is a resistor, said glow discharge device in its low impedance state operating at a level between the nonself-maintained discharge point and the beginning of the normal glow discharge region.

8. A touch responsive switching circuit as set forth in claim 7, wherein the voltage supply terminal is an anode gate terminal of the semiconductor means, the electrically responsive control terminal is a cathode terminal of the semiconductor means, and the output terminal is an anode terminal of the semiconductor means, and wherein a resistor and a capacitor are connected in parallel between said cathode gate terminal and said cathode terminal.

9. A touch responsive switching circuit as set forth in claim 7, wherein the voltage supply terminal is an anode terminal of the semiconductor means, wherein the return terminal is the cathode terminal of the semiconductor means, wherein the electrically responsive control terminal is a cathode gate terminal of the semiconductor means, wherein the output terminal is the anode terminal of the semiconductor means, and wherein a resistor and a capacitor are connected in parallel between said cathode gate terminal and said cathode terminal.

10. A touch responsive switching circuit as set forth in claim 1, wherein the normally high impedance electronic means comprises a pair of glow discharge devices connected in series circuit with the control terminal at the junction between said glow discharge devices, each said glow discharge device in its low impedance state operating at a level between the nonself-maintained discharge point and the beginning of the normal glow discharge region.

11. A touch responsive switching circuit as set forth in claim 1, wherein an energy storage means is connected between the return terminal and the electrically responsive control terminal of the semiconductor means to latch the semiconductor means ON when it is turned ON.

12. A touch responsive switching circuit as set forth in claim 11, wherein the energy storage means is a capacitor.